(12) United States Patent
Leposky et al.

(10) Patent No.: US 7,140,268 B2
(45) Date of Patent: Nov. 28, 2006

(54) COMPACT POWER TRANSFER UNIT

(75) Inventors: George E. Leposky, Belleville, MI (US); Perry Phelan, deceased, late of Harsens Island, MI (US); by Marj Phelan, legal representative, Harsens Island, MI (US); Jonathan M. Adler, Ann Arbor, MI (US); Dennis Cook, Royal Oak, MI (US)

(73) Assignee: Automotive Components Holdings, LLC, Dearborn, MI (US)

( * ) Notice: Subject to any disclaimer, the term of this patent is extended or adjusted under 35 U.S.C. 154(b) by 362 days.

(21) Appl. No.: 10/444,890

(22) Filed: May 23, 2003

(65) Prior Publication Data

US 2004/0231444 A1 Nov. 25, 2004

(51) Int. Cl.
*F16H 1/14* (2006.01)
(52) U.S. Cl. .................. 74/424; 74/606 R; 74/420
(58) Field of Classification Search .......... 74/606 R, 74/424, 423, 420; 180/233
See application file for complete search history.

(56) References Cited

U.S. PATENT DOCUMENTS

| | | | | |
|---|---|---|---|---|
| 2,392,313 A | * | 1/1946 | Dahlstrand | 74/420 |
| 3,708,857 A | * | 1/1973 | Pfeiffer | 29/407.05 |
| 5,950,502 A | * | 9/1999 | Genovese | 74/640 |
| 5,953,964 A | * | 9/1999 | Cognigni et al. | 74/606 R |
| 2003/0029041 A1 | * | 2/2003 | Bendtsen | 29/898.07 |
| 2004/0226766 A1 | * | 11/2004 | Cook et al. | 180/233 |

OTHER PUBLICATIONS

Wikipedia, the free encyclopedia. Idler Gear. http://en.wikipedia.org/wiki/Gear_ratio#Idler_Gears.*

* cited by examiner

*Primary Examiner*—Richard Ridley
*Assistant Examiner*—Justin Krause

(57) ABSTRACT

A motor vehicle power transfer unit includes an input portion, an output portion, a non-parallel gear set and a parallel gear set. The input portion is adapted to connect to an output portion of a transmission assembly and the output portion is adapted to connect to an input portion of a rear wheel drive line. The parallel gear set is coupled to the input portion and transfers power to the non-parallel gear set, which is coupled to the output portion. The non-parallel gear set includes a ring gear having a front face with gear teeth formed therein and a rear face having a cavity formed therein. The ring gear is supported within the power transfer unit by a bearing mounted within the cavity.

20 Claims, 4 Drawing Sheets

COMPACT POWER TRANSFER UNIT

BACKGROUND

1. Field of the Invention

The present invention relates to the power train of a motor vehicle. More specifically, the present invention relates to a power transfer unit in the power train for distributing power to the front and rear wheels of the vehicle.

2. Description of the Prior Art

In the past, most automobiles in the United States utilized a rear wheel drive power delivery scheme. In adapting these rear wheel drive schemes into four wheel drive applications, a transfer case was, and often still is, positioned at the output of the transmission assembly. When engaged, the transfer case diverts a portion of the power coming from the transmission assembly from the rear wheels to the front wheels.

Currently in the United States, a significant portion (if not a majority) of new automobiles are front wheel drive based vehicles. In a front wheel drive vehicle, both the engine and the transmission assembly are typically transversely oriented in the vehicle. By positioning the power plant and transmission assembly transversely in the vehicle, more direct coupling of the transmission assembly to the vehicle's transaxle and front wheels can be achieved. In doing so, a front wheel differential is incorporated directly into the transmission assembly itself.

With front wheel drive vehicles themselves becoming a mature market, a recent trend in the automobile industry has been to adapt these front wheel drive schemes for all or four wheel drive applications. This is accomplished by providing a power transfer unit that diverts a portion of the power from the front wheels to a rear wheel drive shaft and subsequently the rear wheels.

While prior power transfer units work sufficiently well for their intended purposes, their construction limits the extent to which their size can be reduced (thereby making the engine bay unavailable for other components). This also limits packaging flexibility of the units themselves. Normally front differentials in transaxles are of the bevel type and require a large amount of axial space along a direction transverse to the vehicle. As the transaxle package grows axially, it interferes with having equal length halfshafts and furthermore steering, suspension, and engine mount/roll restrictor placement.

As a way of maximizing manufacturing resources, it is also desirable to develop automotive products that can be utilized and incorporated across a variety of platforms. When incorporated into a vehicle, the power transfer unit is attached to the output face of the vehicle transmission. It is therefore in close proximity to the engine, the transmission, the steering rack and the exhaust manifold. Additionally, new PZEV catalytic converters are required to be located closer to the exhaust manifold so that they can achieve a quicker "light-off" of the catalyst. These PZEV catalytic converters also tend to be larger and generate higher temperatures than previous non-PZEV catalytic converters. The proximity to the engine, transmission and the other under hood components accordingly limits the size of the power transfer unit. Further, the high temperature of "manicat" catalytic converters and the previously mentioned PZEV catalytic converters means that polymer based products, such as lubricants and seals, need to be placed at as great a distance as possible from the PZEV catalytic converter.

One manner in which the overall size of the power transfer unit can be reduced is to similarly reduce the size of the gears, bearings and shafts of the power transfer unit itself. However, reducing the size of these components limits their overall torque carrying capacity.

An end result of all of the above is a desire for lateral compactness in the design of the power transfer unit. By compacting this lateral size of the power transfer unit, the power transfer unit can be configured as multiplatform assembly, in that the system itself can be designed for the worst case scenario, in other words the minimum lateral width available for a power transfer unit.

In order to achieve the greatest lateral compactness possible, the gears and bearings located inside the power transfer unit need to be located in the most space efficient manner possible. This can result in conflicts in the sizing and shaping of various components of the unit.

It is therefore an object of the present invention to overcome the above and other limitations of the prior art and to provide a more compact power transfer unit, thereby increasing the available packaging space in the motor vehicle's engine bay.

SUMMARY OF THE INVENTION

The present invention overcomes the limitations of the prior art by providing a power transfer unit with more compact packaging of the components therein, thereby allowing the power transfer unit to be more compact in size.

The power transfer unit includes an input portion that is adapted to connect to an output portion of a transmission assembly, and an output portion that is adapted to connect to an input portion of the rear wheel drive line. A parallel gear set and a non-parallel gear set are coupled between the input portion and the output portion of the power transfer unit.

In a first aspect of the present invention, the non-parallel gear set includes a ring gear having a front face with gear teeth formed therein and a rear face having a bearing seat formed therein. The ring gear is supported within the power transfer unit by a bearing mounted within the bearing seat of the rear face.

In another aspect of the present invention, the non-parallel gear set is a bevel gear set having a ring gear coupled to the parallel gear set and a pinion gear coupled to the output portion of the power transfer unit.

In still another aspect of the present invention, the parallel gear set includes an input gear coupled to the input portion and an output gear coupled to the non-parallel gear set.

Additional objects and features of the present invention will be readily apparent to those skilled in the art from a review of the attached drawings, the following detailed description and the appended claims.

DETAILED DESCRIPTION OF THE PREFERRED EMBODIMENTS

Figure 1:
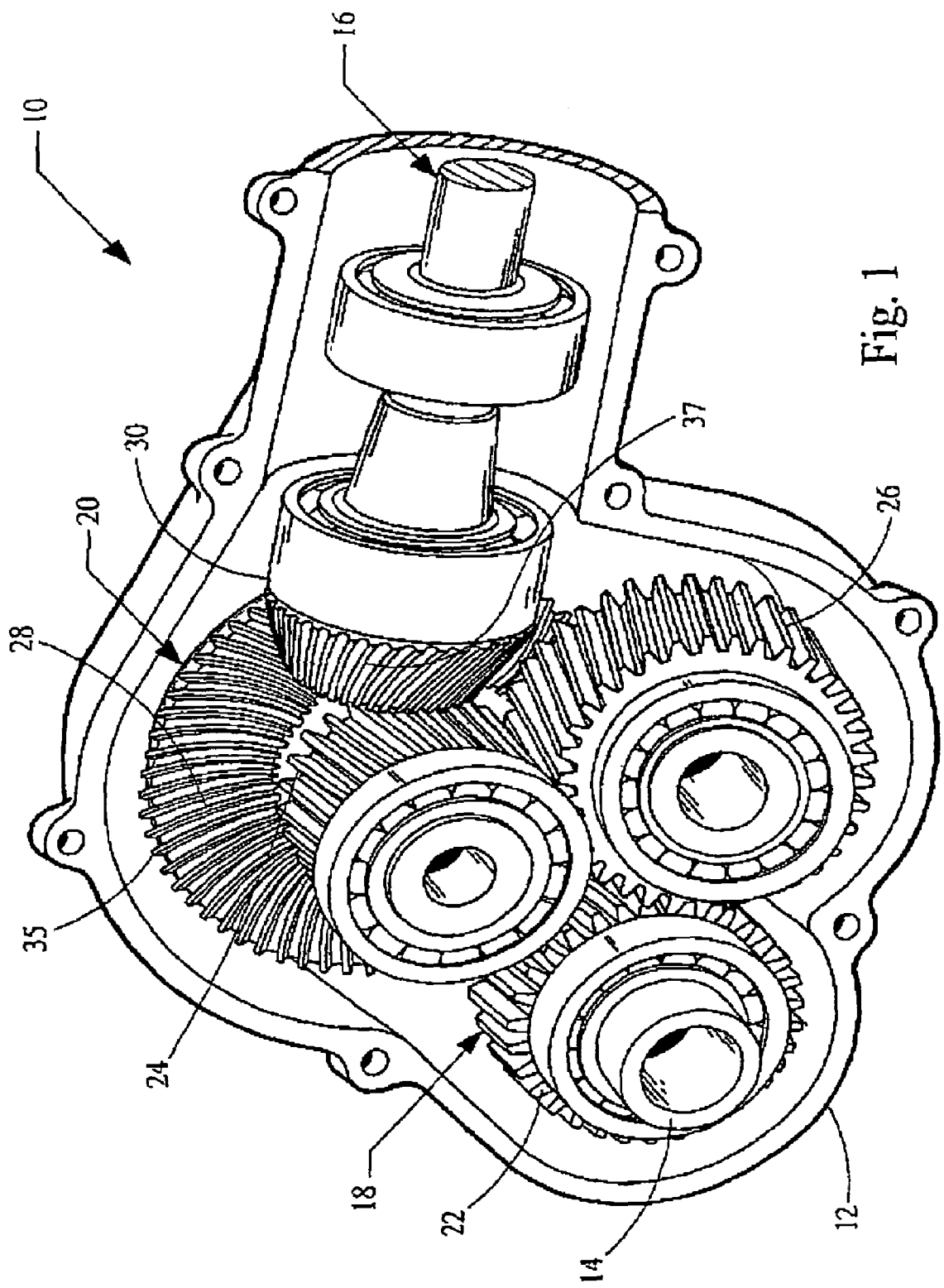
FIG. 1 is a partial break-away view of a first embodiment of a power transfer unit as described in the claims.

Referring now to the drawings, FIG. 1 illustrates a power transfer unit 10 having a housing 12 within which the primary components of the power transfer unit 10 are packaged. The power transfer unit 10 includes an input portion 14 adapted to connect to a transmission (not shown) of an automobile, and an output portion 16 adapted to connect to a rear drive line (not shown) of the automobile. A parallel gear set 18 is coupled to the input portion 14, and a non-parallel gear set 20 is coupled to the output portion 16.

As used herein, the term "parallel gear set" is intended to refer to any mechanism (including, without limitation, mechanisms with gears, gear wheels, mechanisms without gear wheels, gear trains, chain gears and belt systems), which transfers power from a first shaft to a second shaft; the first and second shafts defining axes that are generally parallel to one another.

As used herein, the term "non-parallel gear set" is intended to refer to any mechanism (including, without limitation, mechanisms with gears, gear wheels, mechanisms without gear wheels, gear trains, chain gears and belt systems) for transferring power from a first shaft to a second shaft; wherein the first and second shaft define axes that are not generally parallel to one another.

As mentioned above, the primary components of the power transfer unit 10 are all integrally packaged together and provided within a common housing 12. The input portion 14 and the output portion 16 may or may not protrude from the housing 12 depending on the specific design criteria of the power transfer unit 10 and the application in which it is being employed.

Rotation from a transmission assembly is coupled to the input portion 14 of the power transfer unit 10. The input portion 14 is coupled to the parallel gear set 18 such that rotation from the transmission is transferred to the parallel gear set 18.

The parallel gear set 18 includes, at least, an input gear 22 and an output gear 24. The input portion 14 of the power transfer unit 10 extends outward from the input gear 22 and includes either an internal or external spline adapted to engage an output from the transmission of the vehicle. The input portion 14 could include other features such as a flange, or threaded engagement to allow the input portion 14 of the power transfer unit 10 to engage the transmission.

In a first embodiment, the parallel gear set 18 is a three axis parallel gear set, as shown in FIG. 1. The three axis parallel gear set additionally includes an idler gear 26. Rotation is transmitted to the input gear 22 from the input portion 14, from the input gear 22 to the idler gear 26, and from the idler gear 26 to the output gear 24. As shown, the input gear 22, the idler gear 26, and the output gear 24 all rotate about axes which are parallel to one another, and transverse to the vehicle.

Figure 2:
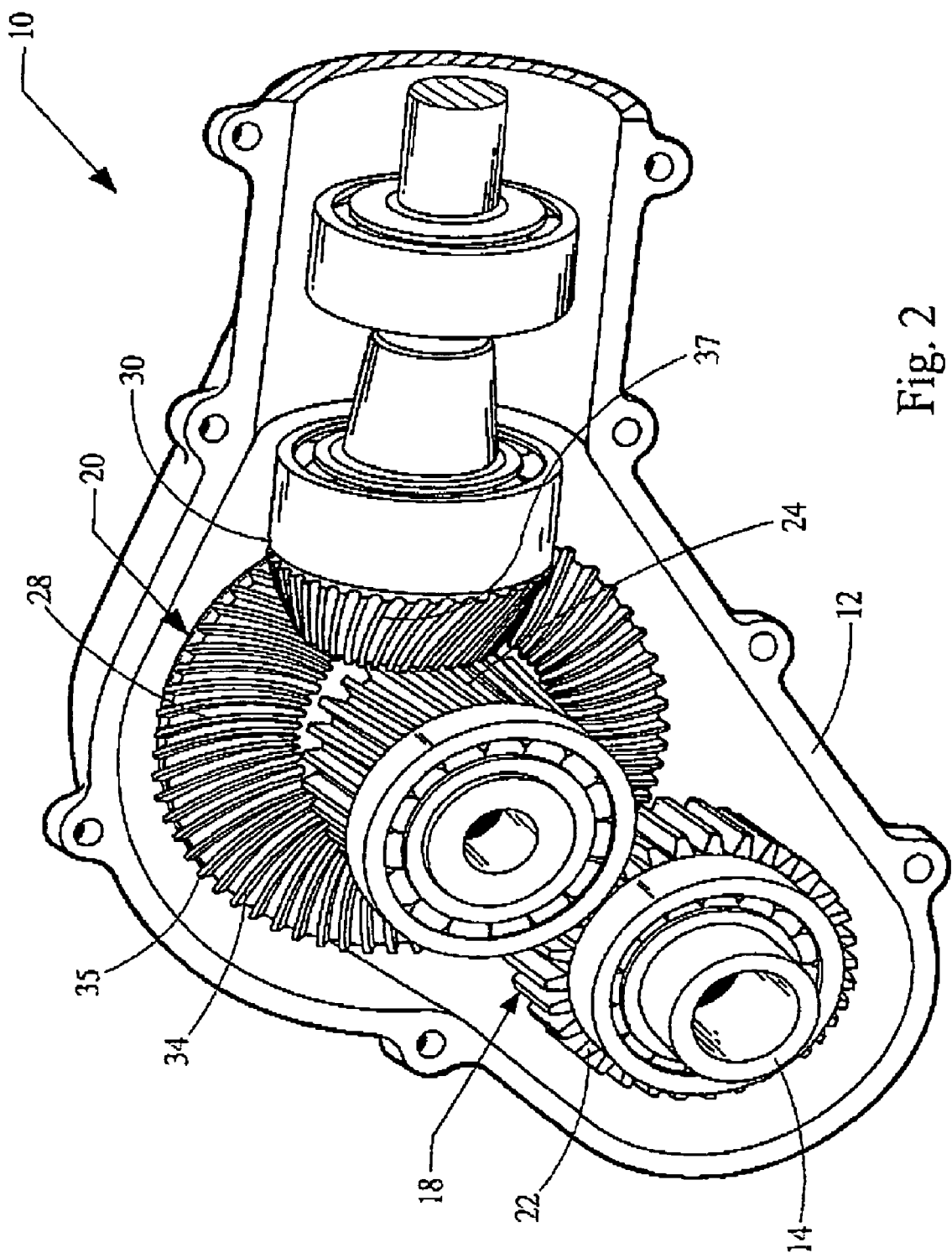
FIG. 2 is a partial break-away view of a second embodiment of the power transfer unit.

Alternatively, the parallel gear set 18 can be a two axis parallel gear set, as shown in FIG. 2, wherein the input gear 22 and the output gear 24 directly engage one another such that rotation is transmitted directly from the input gear 22 to the output gear 24. The input gear 22 and the output gear 24 all rotate about axes which are parallel to one another, and transverse to the vehicle. In either of the embodiments shown in FIGS. 1 and 2, the input gear 22, the output gear 24, and the idler gear 26, if one is being incorporated, can be either helical gears or spur gears.

As an alternative a chain or belt (not shown) could be used to interconnect the input gear 22 and the output gear 24. Additionally, the relative diameters of the gears 22, 24, 26 may be the same or different, as determined by design criteria not relevant to an understanding of the present invention.

The non-parallel gear set 20 includes a bevel ring gear 28 and a bevel pinion gear 30. The ring gear 28 is coupled to the output gear 24 such that rotation from the parallel gear set 18 is transferred to the ring gear 28 of the non-parallel gear set 20. The pinion gear 30 is coupled to the output portion 16 of the power transfer unit 10 such that rotation is transferred from the ring gear 28 to the pinion gear 30 and through the pinion gear 30 to the output portion 16 of the power transfer unit 10.

Figure 3:
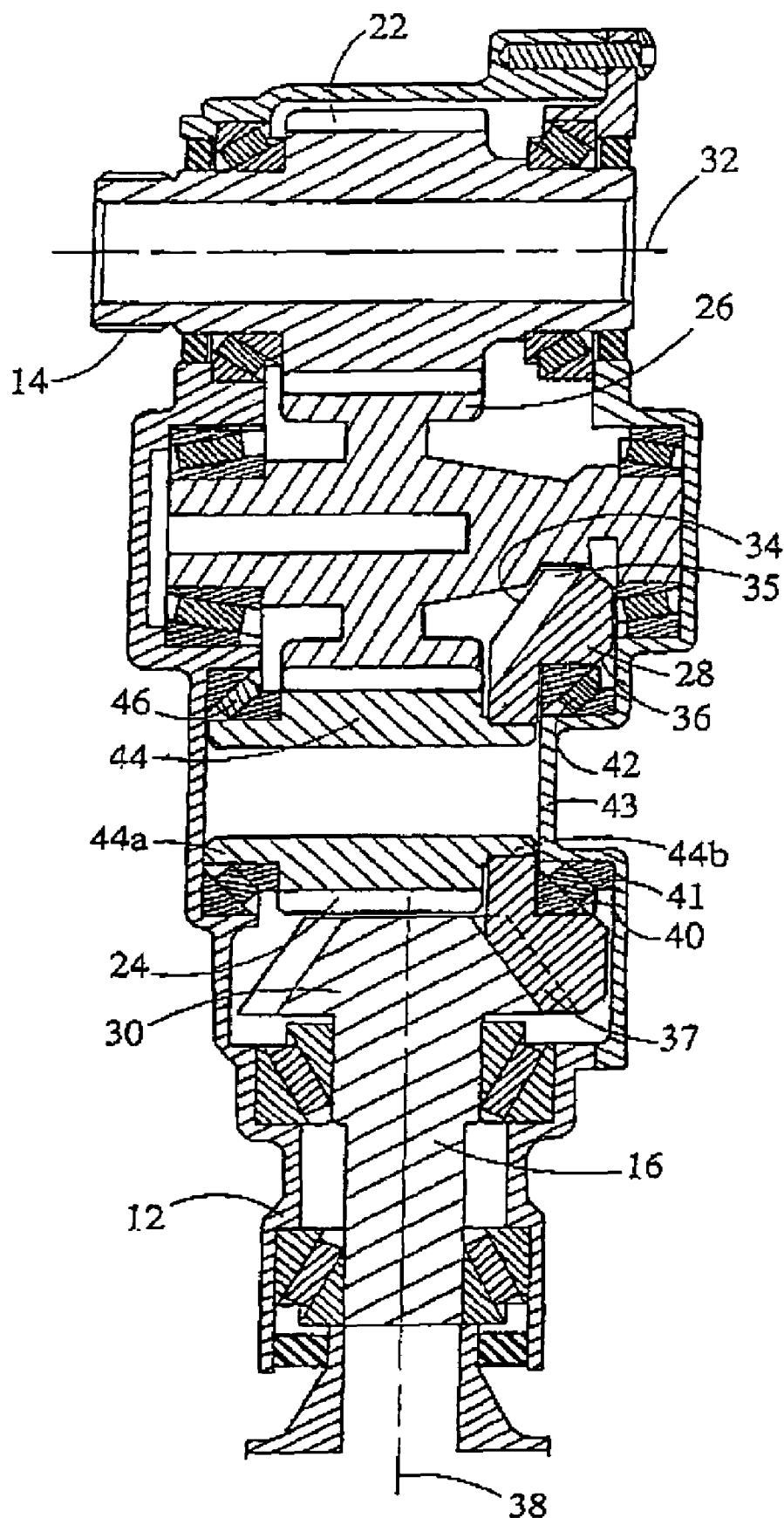
FIG. 3 is a layout view of the input portion, parallel gear set, non-parallel gear set, and output portion of the power transfer unit as described in the claims.

Referring to FIG. 3, a layout view of the three axis power transfer unit 10 is shown wherein the rotational movement is transferred into the power transfer unit 10 through the input portion 14; from the input portion 14 through the input gear 22, the idler gear 26, and the output gear 24; from the output gear 24 of the parallel gear set 18 to the ring gear 28 of the non-parallel gear set 20; across the non-parallel gear set 20 from the ring gear 28 to the pinion gear 30; and from the pinion gear 30 to the output portion 16 of the power transfer unit 10.

The ring gear 28 is mounted within the housing 12 in a manner that enables the ring gear 28 to rotate about a first axis 32 which extends transversely relative to the vehicle. The ring gear 28 includes a front face 34 and a rear face 36. The front face 34 of the ring gear 28 includes a gear teeth 35 adapted to engage corresponding gear teeth 37 on the pinion gear 30. The pinion gear 20 is mounted within the housing 12 in a manner that enables the pinion gear 30 to rotate about a second axis 38 which is oriented generally perpendicular to the first axis 32 and extends longitudinally with respect to the vehicle in the illustrated embodiment.

While not readily apparent in the Figures, the first and second axes 32, 38, about which the ring gear 28 and the pinion gear 30 respectively rotate, may be oriented such that the axes 32, 38 intersect one another or do not intersect one another. In the latter situation, the non-parallel gear set is seen to be a hypoid bevel gear set.

Figure 4:
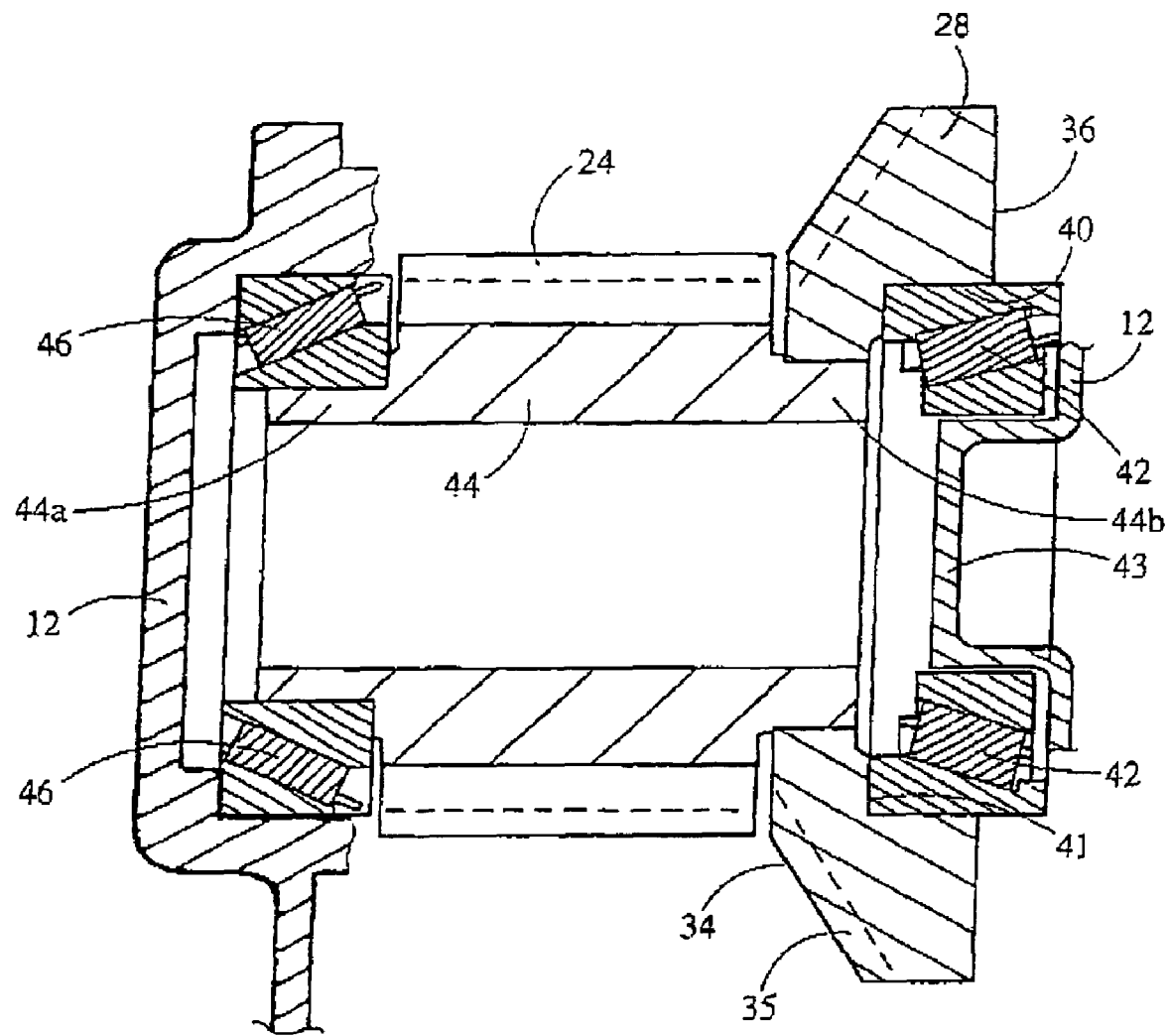
FIG. 4 is a side sectional view of an output gear of the parallel gear set and a ring gear of the non-parallel gear set of the power transfer unit.

Referring to FIG. 4, the rear face 36 of the ring gear 28 includes a cavity 40 formed therein. The cavity 40 defines a bearing seat 41. The ring gear 28 is mounted within the housing 12 and supported therein by a bearing 42 that fits within the bearing seat 41. An outer race of the bearing 42 is received by and supported within the bearing seat 41. An inner race of the bearing is, in turn, supported directly on the radial surface of a boss 43 formed in the housing 12. By embedding the bearing 42 within the rear face 36 of the ring gear 28, the width of the power transfer unit 10 can be decreased without requiring a smaller bearing, and providing enhanced lateral compactness. Further, by mounting the bearing 42 directly within the ring gear 28, the ring gear 28 is directly positioned with respect to the housing 12, the amount of stack-up error within the components is reduced, and concentricity between the ring gear 28 and the bearing 42 is maintained.

Finally, by incorporating the support bearing 42 within a cavity 40 formed in the rear face 36 of the ring gear 28, the width of the power transfer unit 10 can be compacted, thereby allowing the power transfer unit 10 to be designed for smaller packaging situation without sacrificing the power or durability of the power transfer unit 10.

The output gear 24 is supported on a transfer shaft 44. The transfer shaft 44 has a first end 44a that is supported by a bearing 46, and a second end 44b that is supported directly on the bevel ring gear 28. The output gear 24 can be integrally formed with the transfer shaft 44, or the output gear 24 can be mounted onto the transfer shaft. The transfer shaft 44 engages the bevel ring gear 28 by being press fit, splined, or by other suitable means, such that the transfer shaft 44 is supported solely by the bearing 46 and the bevel ring gear 28.

By utilizing the parallel gear set 18 and the non-parallel gear set 20, it becomes possible to locate the parallel gear set 18 tightly against the housing (not shown) of the transmission assembly. This is possible because the non-parallel gear set 20 requires less longitudinal space than would a comparable parallel gear set. With the parallel gear set 18 located adjacent to the transmission assembly, reduced "roll" forces are experienced by the transmission assembly and the remainder of the drive chain.

Use of the parallel gear set 18 and the non-parallel gear set 20 also more readily allows the drive line to be moved to the centerline of the vehicle and at the desired height. If the non-parallel gear set 20 were employed to move the drive line back to the vehicle's centerline, large diameter gears or gear rings would need to be used, creating additional problems relating to packaging size and other constraints.

The foregoing discussion discloses and describes a preferred embodiment of the invention. One skilled in the art will readily recognize from such discussion, and from the accompanying drawings and claims, that changes and modifications can be made to the invention without departing from the true spirit and fair scope of the invention as defined in the following claims.

We claim:

1. A motor vehicle power transfer unit for transmitting torque between a front wheel drive line and a rear wheel drive line, said power transfer unit comprising:
    a housing;
    an input portion;
    an output portion:
    a parallel gear set and a non-parallel gear set coupled between said input portion and said output portion, the parallel gear set including an output gear driveably connected to the input portion and to the non-parallel gear set;
    said non-parallel gear set including a ring gear secured directly to the output gear, having a front face with gear teeth formed therein and facing the output gear, and a rear face having a bearing seat formed therein;
    a first bearing located in said bearing seat at a first axial side of the output gear and supported on a boss of the housing; and
    a second bearing aligned with the first bearing, located at a second axial side of the output gear opposite the first side, and supported on the housing, the output gear and at least a portion of the front face of the ring gear being located axially between the first bearing and the second bearing.

2. The power transfer unit of claim 1 wherein said non-parallel gear set is a bevel gear set.

3. The power transfer unit of claim 2 wherein said bevel gear set is a hypoid bevel gear set.

4. The power transfer unit of claim 1 wherein said parallel gear set further includes an input gear driveably connected to said input portion and the output gear.

5. The power transfer unit of claim 4 wherein said parallel gear set is a two-axis gear set such that said input gear engages said output gear.

6. The power transfer unit of claim 4 wherein said parallel gear set is a three-axis gear set including and idler gear such that said input gear engages said idler gear and said idler gear engages said output gear.

7. The power transfer unit of claim 4 wherein said non-parallel gear set is a bevel gear set having a ring gear coupled to said output gear and a pinion gear.

8. The power transfer unit of claim 1 wherein said output gear is secured to said ring gear at a location between the first bearing and gear teeth formed on the output gear.

9. The power transfer unit of claim 1 wherein said output gear is integrally formed with a transfer shaft including a first end length and a second end length, said second end length being supported by the second bearing and said first end length being secured directly to said ring gear and driveably connected to the ring gear.

10. The power transfer unit of claim 1, further comprising:
    a transfer shaft including a first end length secured directly to the ring gear, and a second end length supported on the second bearing; and
    wherein said output gear is mounted onto said transfer shaft.

11. A motor vehicle power transfer unit comprising:
    a housing formed with a boss;
    a parallel gear set including an output gear;
    a non-parallel gear set driveably connected to the output gear;
    said non-parallel gear set including a ring gear secured directly to the output gear, having a front face with gear teeth formed therein and facing the output gear, and a rear face having a bearing seat formed therein;
    a first bearing located in said bearing seat at a first axial side of the output gear and supported on the boss off the housing; and
    a second bearing aligned with the first bearing, located at a second axial side of the output gear opposite the first side, and supported on the housing, the output gear and at least a portion of the front face of the ring gear being located axially between the first bearing and the second bearing.

12. The power transfer unit of claim 11 wherein said non-parallel gear set is a bevel gear set.

13. The power transfer unit of claim 12 wherein said bevel gear set is a hypoid bevel gear set.

14. The power transfer unit of claim 11 wherein said non-parallel gear set further includes the ring gear and a pinion gear coupled to said ring gear.

15. The power transfer unit of claim 11 wherein said output gear is integrally formed with a transfer shaft including a first end length and a second end length, said second end length being supported by the second bearing and said first end length being secured directly to said ring gear and driveably connected to the ring gear.

16. The power transfer unit of claim 11 further comprising:
    a transfer shaft including a first end length secured directly to the ring gear, and a second end length supported on the second bearing; and
    wherein said output gear is mounted onto said transfer shaft.

17. The power transfer unit of claim 11 wherein said output gear is secured to said ring gear at a location between the first bearing and gear teeth formed on the output gear.

18. The power transfer unit of claim 11 wherein said parallel gear set further includes an input gear driveably connected to the output gear.

19. The power transfer unit of claim 18 wherein said parallel gear set is a two-axis gear set wherein said input gear engages said output gear.

20. The power transfer unit of claim 18 wherein said parallel gear set is a three-axis gear set including and idler gear wherein said input gear engages said idler gear and said idler gear engages said output gear.

* * * * *